（12）United States Patent
Sauser et al.

(10) Patent No.: US 12,077,226 B2
(45) Date of Patent: Sep. 3, 2024

(54) BIFURCATABLE ROAD BUILDING MATERIAL APPARATUS AND METHOD

(71) Applicant: Terex USA, LLC, Westport, CT (US)

(72) Inventors: Edwin Sauser, Monticello, IA (US); Alan P. Eisner, Meguon, WI (US)

(73) Assignee: Terex USA, LLC, Norwalk, CT (US)

( * ) Notice: Subject to any disclaimer, the term of this patent is extended or adjusted under 35 U.S.C. 154(b) by 1939 days.

(21) Appl. No.: 15/922,266

(22) Filed: Mar. 15, 2018

(65) Prior Publication Data

US 2018/0200725 A1    Jul. 19, 2018

Related U.S. Application Data

(62) Division of application No. 14/176,683, filed on Feb. 10, 2014, now Pat. No. 9,937,502, which is a division of application No. 11/765,334, filed on Jun. 19, 2007, now Pat. No. 8,650,037.

(60) Provisional application No. 60/867,713, filed on Nov. 29, 2006, provisional application No. 60/805,548, filed on Jun. 22, 2006.

(51) Int. Cl.
| | |
|---|---|
| *E01C 19/05* | (2006.01) |
| *B02C 21/02* | (2006.01) |
| *B62D 49/00* | (2006.01) |
| *B62D 49/06* | (2006.01) |
| *B62D 53/00* | (2006.01) |
| *B62D 53/02* | (2006.01) |
| *B62D 53/04* | (2006.01) |
| *B62D 53/06* | (2006.01) |

(52) U.S. Cl.
CPC ............ *B62D 53/04* (2013.01); *B62D 49/00* (2013.01); *B62D 49/065* (2013.01); *B62D 53/005* (2013.01); *B62D 53/02* (2013.01); *E01C 19/05* (2013.01); *B02C 21/02* (2013.01); *B62D 53/06* (2013.01)

(58) Field of Classification Search
CPC ...... B62D 53/04; B62D 53/06; B62D 63/061; B62D 49/065; B02C 21/02; B02C 21/026; E01C 19/05; E01C 19/15; E01C 19/12; B60P 1/6481
USPC ........... 280/401, 638, 656; 414/498; 404/90, 404/93; 241/101.71, 101.75
See application file for complete search history.

(56) References Cited

U.S. PATENT DOCUMENTS

| | | | | |
|---|---|---|---|---|
| 3,073,536 | A | | 1/1963 | Quinn |
| 3,374,010 | A * | | 3/1968 | Crockett ............ B62D 53/0807 280/682 |
| 3,409,235 | A * | | 11/1968 | Quinn ..................... B02C 21/02 241/101.76 |
| 3,563,477 | A * | | 2/1971 | Schroeder ............... B02C 21/02 241/101.76 |

(Continued)

OTHER PUBLICATIONS

"Three Short Become Two Long, if the EU Follows the Example Set by Sweden and Finland", Fewer Trucks Improve the Environment, by Kenneth Ramberg, Transport & Infrastructure (Oct. 2004).

*Primary Examiner* — Christopher B Wehrly
(74) *Attorney, Agent, or Firm* — Simmons Perrine Moyer Bergman PLC

(57) ABSTRACT

A bifurcatable mobile rock crusher and method of transporting the same comprising providing a first segment which is separately towable on the highway and providing a second segment which is separately towable on the highway, where (Continued)

each segment is configured to be combined into one unit and towed as a unit on the highway.

19 Claims, 4 Drawing Sheets

(56) References Cited

U.S. PATENT DOCUMENTS

| | | | |
|---|---|---|---|
| 3,567,252 A * | 3/1971 | Zubko | B60P 1/6481 |
| | | | 280/418.1 |
| 4,491,279 A | 1/1985 | Long et al. | |
| 4,585,179 A | 4/1986 | Tsuji et al. | |
| 4,655,402 A | 4/1987 | Desourdy | |
| 5,647,545 A | 7/1997 | Conner | |
| 5,935,587 A | 8/1999 | Cauwet et al. | |
| 6,663,185 B1 | 12/2003 | Richards | |
| 7,774,133 B2 | 8/2010 | Schwarzmann | |
| 2005/0263626 A1 * | 12/2005 | Brock | B65G 41/008 |
| | | | 241/30 |
| 2010/0152998 A1 | 8/2010 | Schwarzmann | |

* cited by examiner

BIFURCATABLE ROAD BUILDING MATERIAL APPARATUS AND METHOD

CROSS REFERENCE TO RELATED APPLICATIONS

This application is a divisional of a non-provisional application filed on Feb. 10, 2014, and having Ser. No. 14/176,683, which claims the benefit of a divisional of a non-provisional application filed on Jun. 19, 2007, and having Ser. No. 11/765,334, now U.S. Pat. No. 8,650,037 issued on Feb. 11, 2014, and claims the benefit of a provisional application filed on Jun. 22, 2006, and having Ser. No. 60/805,548 and a provisional application filed on Nov. 29, 2006 having Ser. No. 60/867,713. This application also relates to an application filed on Jun. 19, 2007 having Ser. No. 11/765,341 entitled "MOBILE AGGREGATE CRUSHING SYSTEM AND METHOD"; which was issued on Apr. 24, 2102 having U.S. Pat. No. 8,162,245.

BACKGROUND OF THE INVENTION

This invention relates to rock crushing plants and other road aggregate or building material processing systems. More specifically, this invention relates to mobile crushing plants which are capable of being transported over public highways.

Several techniques and numerous equipment arrangements for moving rock crushing plants from one location to another are known from the prior art. Particularly relevant to the present invention is the use of modular rock crushing systems where the components of the entire system can be broken down and transported via semi-trucks to another location. Typically, the modular rock crushing system would be designed to be broken down to travel on the public roadways of a state which has the most restrictive size and weight limitations.

While such prior art modular mobile rock crushing systems have enjoyed considerable success in the past, they do have some drawbacks. Such modular mobile rock crushing system designs often resulted in using more trucks to move a rock crushing plant than would be legally required if the plant were being moved within states or between states that have size and weight restrictions higher than the aforementioned most restrictive size and weight restrictions. In some jurisdictions, a series of trailers can be simultaneously pulled behind one semi-truck. However, some states either prohibit or regulate towing multiple trailers arranged so that they have a capability for substantial angular articulation between the trailers.

One prior art system is described in U.S. Pat. No. 3,563,477 to Schroeder. This patent describes an oversized portable bulk material processing plant which comprises two sections which can be joined together into a unitary oversized vehicle or which may be separated and FORMED into individual vehicles for independent highway travel. The design in Schroeder requires the addition of a set of wheels to FORM a second trailer and when combined, the unified structure is oversized. This attachment of a set of wheels would involve considerable time, effort and skill to accomplish.

Consequently, a need remains in the industry for an improved modular mobile rock crushing system which has flexibility to easily accommodate the various regulations in several jurisdictions and thereby reduces wasted energy and wear and tear of semi-trucks when more of such trucks are used to move a system than would be legally required. The primary objective of this invention is to meet this need.

SUMMARY OF THE INVENTION

More specifically, an object of the invention is to provide a bifurcatable aggregate or road building material system which provides a screen, crusher, trommel or a road building material handling apparatus which is disposed on two trailers which could be combined and towed as a single trailer (without an intermediate articulation point) behind one semi-truck or split into two to be transported behind two independent semi-trucks.

Another object of the present invention is to provide a method of moving road building material handling systems from one state to another where differing numbers of semi-trucks are used in different states.

Yet another object of the invention is to provide rapid switching between a single semi-truck tow vehicle to multiple semi-truck tow vehicles for any one given road building material handling apparatus, especially without the need for adding a set of wheels to form a second trailer.

Other and further objects of the invention, together with the features of novelty appurtenant thereto, may appear in the detailed description and the drawings.

The present invention comprises a road building material handling apparatus which is configured to be bifurcated into two segments, each of which is configured to be towed by an independent tow vehicle or, in the alternative, each segment could be combined into a single combined unit which is towed by a single tow vehicle.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
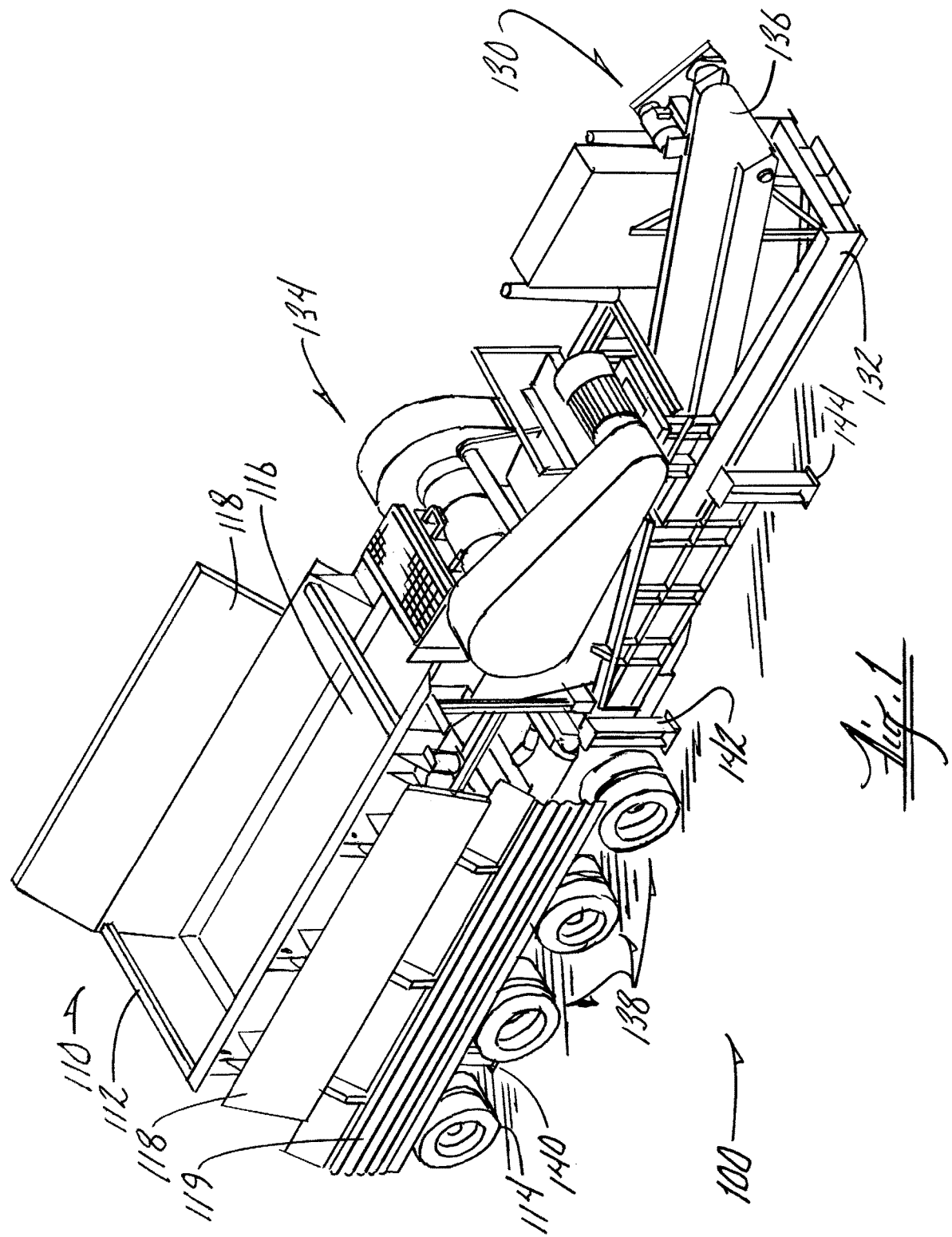
FIG. 1 is a perspective view of a mobile jaw rock crusher of this invention.

Referring now to the drawings, where like numerals refer to like matter throughout, and referring in greater detail, attention is first directed to FIG. 1, where there is shown a bifurcatable crusher 100 having a material feed section 110 disposed at a rear end of bifurcatable crusher 100 and a rock crusher section 130 which is disposed at the front end of the combined bifurcatable crusher 100. Material feed section 110 includes a material feeder section input hopper 112 with material feeder section conveyor 116 and material feeder section folding wings 118, which are used to extend the size of the dumping zone for the material feeder section input hopper 112. Folding stowable trailer misfeed protecting cover 119 is used to protect the trailer from damage caused by misfed material which is intended for the material feeder section input hopper 112, but falls outside the dumping zone and otherwise might strike the trailer. Folding stowable trailer misfeed protecting cover 119 can be folded and stowed during traveling as shown in the figures.

Material feed section 110 is shown with material feeder section trailer wheels 114. Rock crusher section 130 is shown with rock crusher section frame 132, rock crusher 134, rock crusher output conveyor 136, rock crusher trailer wheels 138, rock crusher trailer rear jack 140, rock crusher trailer middle jack 142, and rock crusher trailer front jack 144. When the bifurcatable crusher 100 is a unified structure as shown in FIG. 1, it functions as a rock crusher where rocks, concrete and other materials known to be fed into a rock crusher are dropped into material feeder section input hopper 112 and fed by the material feeder section conveyor 116 into the rock crusher 134, where they are processed and output on rock crusher output conveyor 136. The bifurcatable crusher 100 is towable as a single non-intermediately articulating trailer.

Figure 2:
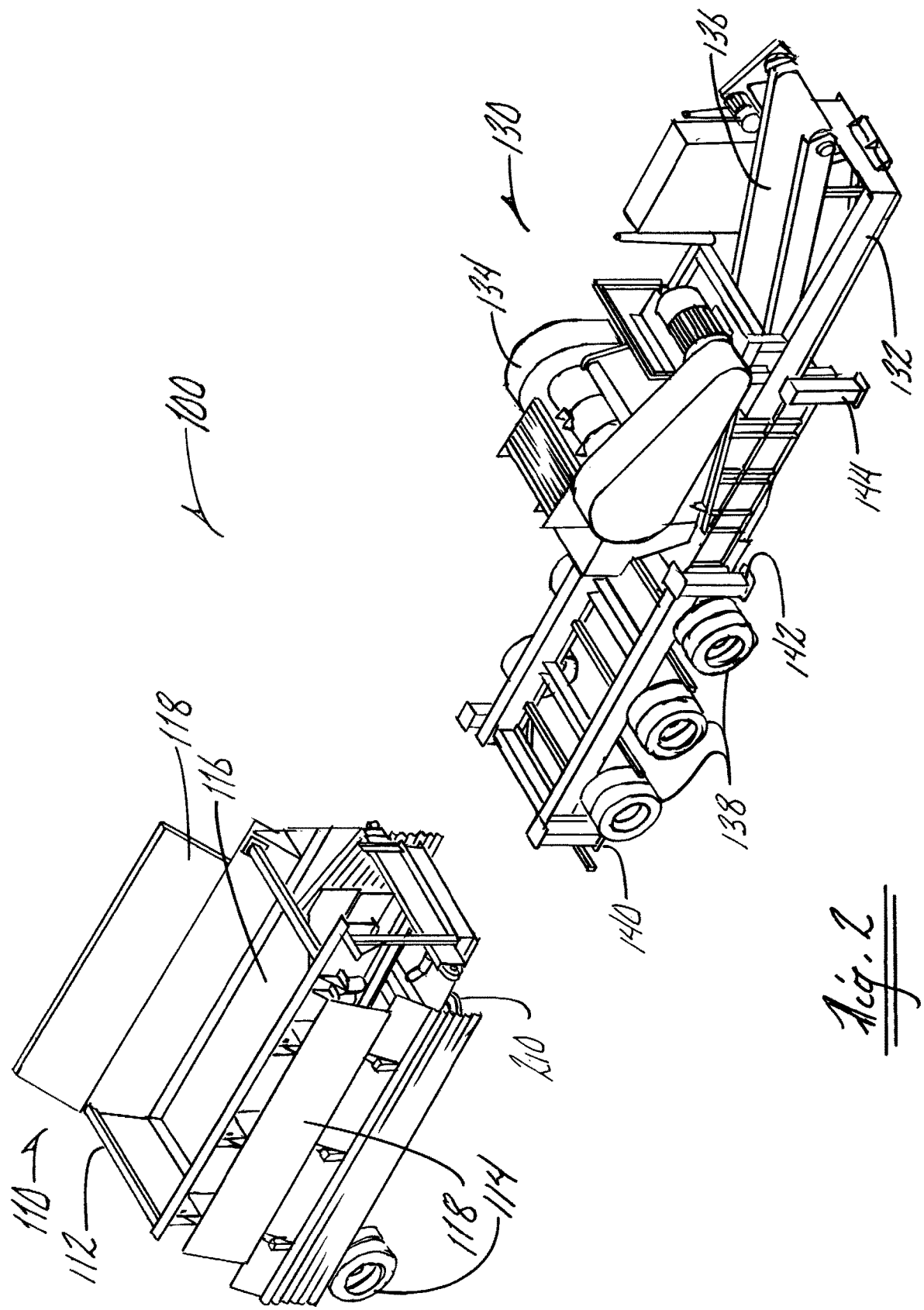
FIG. 2 is a partially exploded view of a mobile jaw rock crusher of FIG. 1.

Now referring to FIG. 2, there is shown the bifurcatable crusher 100 after it has been divided into separate material feed section 110 and rock crusher section 130. FIG. 2 shows a material feeder trailer jack 210 in a deployed position. Material feeder trailer jack 210 is preferably both retractable (length adjustable) and pivotable via hydraulic power.

Figure 3:
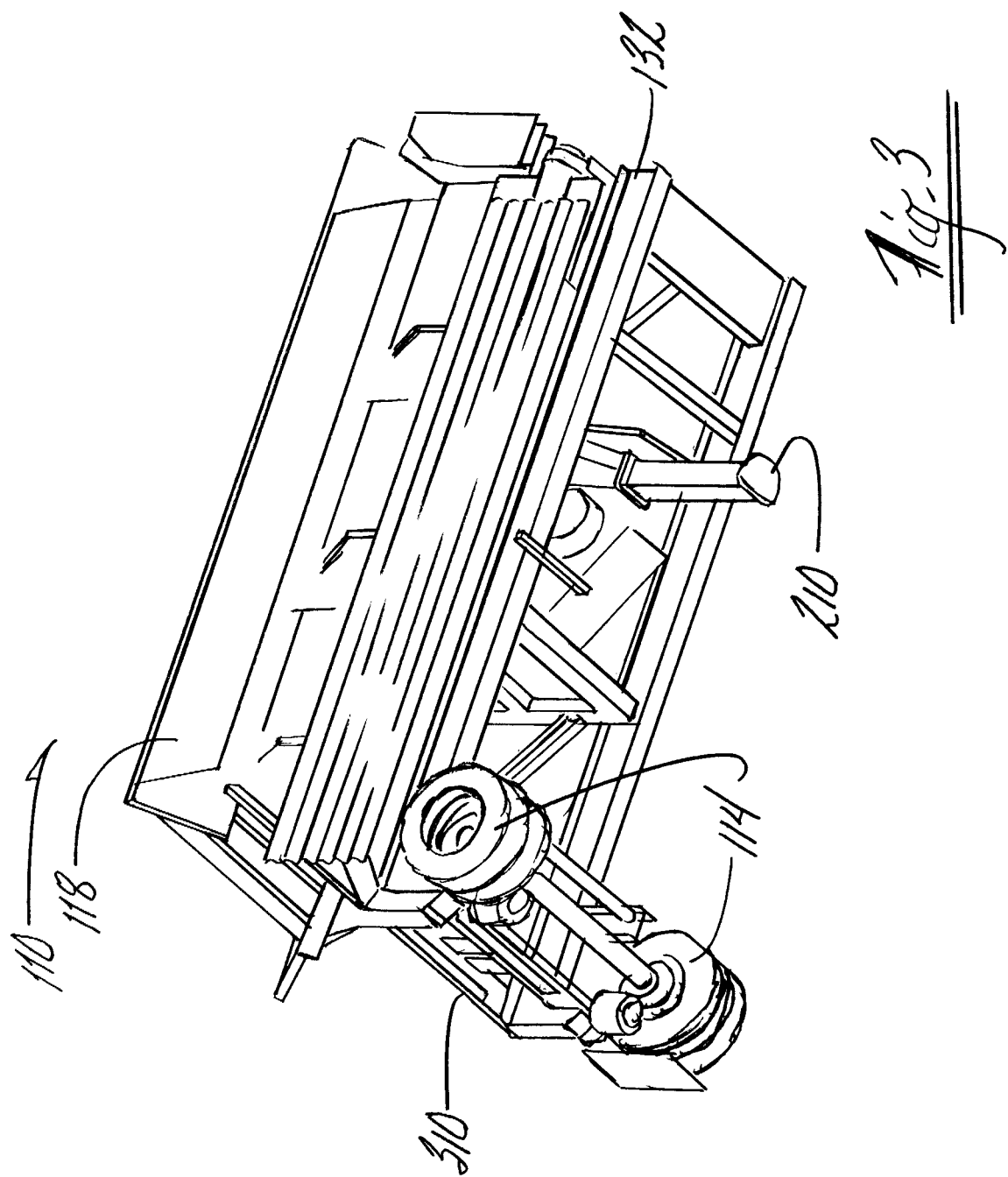
FIG. 3 is a perspective view of an underside portion of the mobile jaw rock crusher of FIGS. 1 and 2, where a stowable jack is shown in the deployed position.

Now referring to FIG. 3, there is shown a perspective view looking upward at the bottom of the material feed section 110, which shows the material feeder trailer jack 210 in a deployed position, and also shows the material feeder section gas-powered hydraulic pump 310, which is intended to provide hydraulic power to operate portions of the material feed section 110, such as the material feeder section folding wings 118, the folding stowable trailer misfeed protecting cover 119, folds material feeder trailer jack 210 and extends material feeder trailer jack 210.

Figure 4:
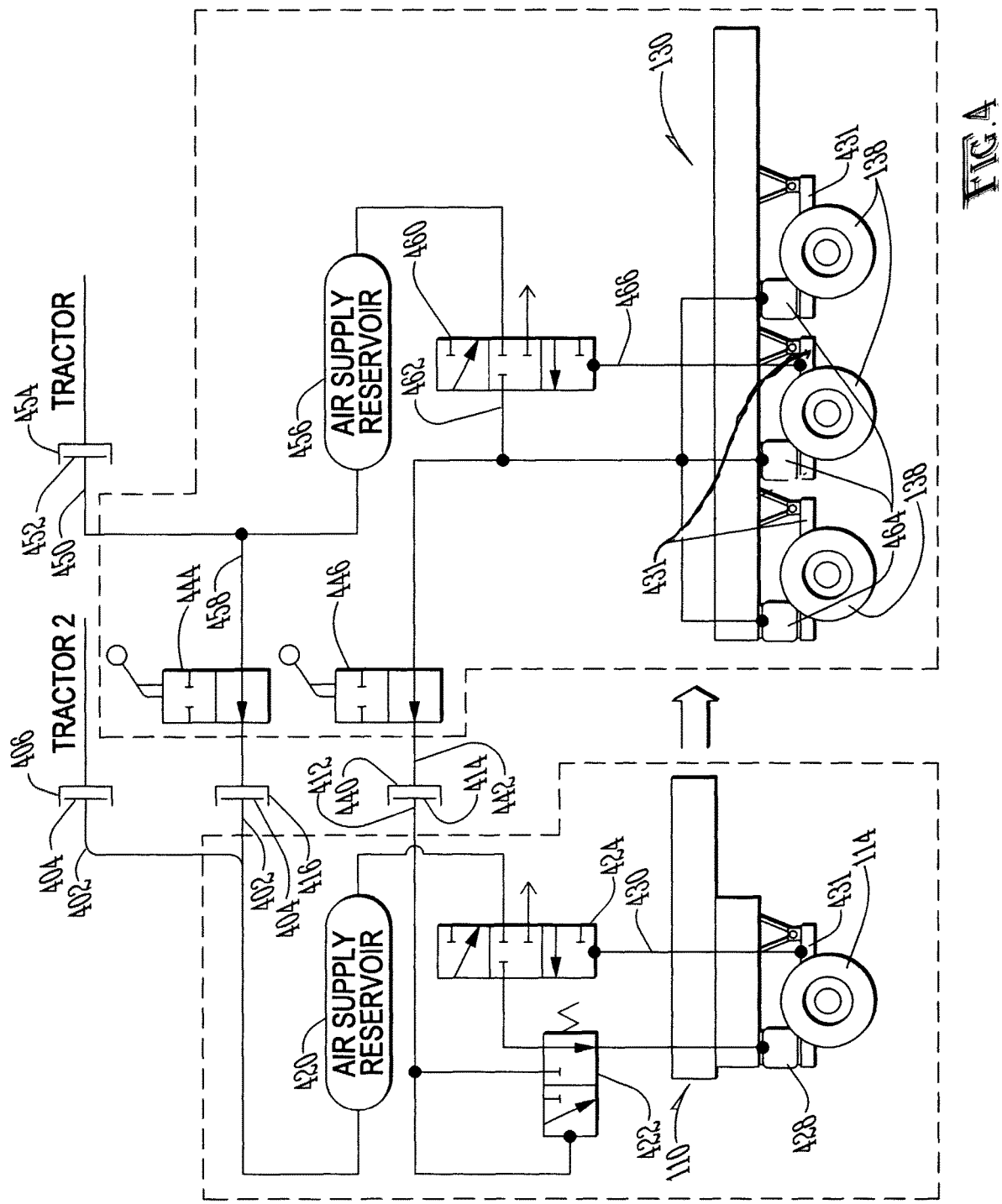
FIG. 4 is a schematic diagram of the pneumatic system of the present invention.

Now referring to FIG. 4, there is shown a pneumatic schematic diagram which is divided into two sections; the right section in the dashed lines represents the pneumatic structure on the rock crusher section 130, while the left side of FIG. 4 in the dashed line enclosure represents the pneumatic structure on the material feed section 110.

Referring to the left section of FIG. 4, there is shown an independent height adjustable air supply line 402 and an independent height adjustable air supply line quick coupler component 404. FIG. 4 shows two independent lines of differing length. In an alternate embodiment, one line could be used as the connection between independent height adjustable air supply line quick coupler component 404 and tractor-to-trailer air supply line quick connect coupler component 406. This connection would not occur at the same time as a connection between independent height adjustable air supply line quick coupler component 404 and inter-section independent suspension height quick connect component 416. Independent height adjustable air supply line quick coupler component 404 and tractor-to-trailer air supply line quick connect coupler component 406 may be standard airline quick connect or proprietary quick connects if desired. Independent height adjustable air supply line 402 provides air to feeder air supply reservoir 420, which provides air to the brake system (if desired) and to feeder suspension height valve 424, which adds or exhausts air to the feeder suspension air bag 428 via feeder section independent to common suspension control valve 422. Coupler 414 and inter-section common suspension height quick connect component 440 provide air to common supply line 412 which provides air to feeder section independent to common suspension control valve 422 to shuttle feeder section independent to common suspension control valve 422 and overrides feeder suspension height valve 424 and provides pressure to feeder suspension air bag 428 resulting in a common pressure in all air bags. Feeder suspension height valve 424 could be an industry standard height control valve or any suitable substitute. Feeder section independent to common suspension control valve 422 could be a pilot valve, manual valve or any suitable substitute, which diverts or directs air pressure either from valve 424 (for independent travel) or from common supply line 412. Feeder suspension height valve 424 is coupled to feeder section independent to common suspension control valve 422 and via feeder suspension linkage 430 and suspension arm 431.

On the right side of FIG. 4, there is shown a tractor-to-trailer air supply line quick connect component 454 coupled to a crusher section main air supply quick connect component 452 and via crusher section main air supply line 450 to crusher section air supply reservoir 456, which provides air to the brake system (not shown) and to crusher section suspension height valve 460, which is coupled to a suspension arm 431 by suspension linkage 466.

Crusher section suspension height valve 460 is coupled via crusher section suspension supply line 462 to the various crusher section suspension air bags 464 and also to manual shut-off 446 and via inter-section common suspension height supply line 442 to inter-section common suspension height quick connect component 440, which couples it to feeder section independent to common suspension control valve 422 as discussed above to provide for common suspension height control when material feed section 110 and rock crusher section 130 are combined. The air suspension system of the present invention can be designed so that only one axle is monitored for height control and the other axles only are only pressure controlled. The primary purpose would be focused on an equalized axle load, not equal height control. The actual lengths of the air bags would vary due to frame deflection, frame slope, or ground level.

Crusher section main air supply line 450 is coupled via crusher section independent suspension height supply line 458 to inter-section independent suspension height manual shut-off 444, which is coupled to inter-section independent suspension height quick connect component 416.

The material feed section 110 and rock crusher section 130 can be used and then separated using the following process:

1. Towing tractor is attached to front of combined chassis; i.e., to front of rock crusher section 130 and airlines are attached at crusher section main air supply quick connect component 452.

2. Air system, including both feeder air supply reservoir 420 and crusher section air supply reservoir 456, is charged from towing tractor.

3. Disconnect rear chassis suspension air lines, both independent height adjustable air supply line 402 and common supply line 412 and electrical lines; this thereby locks the rear axle and applies the brakes.

4. Disconnect mechanical latch of some type to enable relative movement between the chassis.

5. Tow rock crusher section 130 chassis forward, sliding under material feed section 110 chassis until contact with a slide stop.

6. Start material feeder section gas-powered hydraulic pump 310 and unfold material feeder trailer jack 210 to vertical position.

7. Extend material feeder trailer jack 210 to lift material feed section 110 chassis above slide stop.

8. Tow rock crusher section 130 chassis away from material feed section 110 chassis.

9. Back the feeder tow tractor into position under material feed section 110 chassis.

10. Use material feeder trailer jack 210 to adjust height to allow engagement with towing tractor.

11. Continue backing tractor into material feed section 110 chassis until king pin locks engagement.

12. Hydraulically retract and fold material feeder trailer jack 210 and turn off material feeder section gas-powered hydraulic pump 310.

13. Attach air and electric lines to towing tractor.

14. Turn manual rear axle brake valve to "off" position. (In some embodiments, this step may be omitted.)

In an alternate embodiment, to separate the feeder from the crusher, leaving the crusher in place, you could repeat steps 1 through 3, then release the brakes in axle 114 while retaining pressure in the air bag 428, then release the mechanical latch, thereby allowing relative movement aided by a hydraulic or winch-type system to move chassis 110 backwards to the mechanical stop.

Also, rollers could be used to further facilitate relative movement of the two chassis.

The terms "road building materials" are used throughout this description as an example of a common use of aggregate materials. It should be understood that the terms "road building materials" are intended to include aggregate materials, irrespective of the actual use to which such aggregate materials may be put. Similarly, the terms "rock crusher" are used as a common example of the use of a crusher; however, the terms "rock crusher" are intended to include any crusher, whether it is rock, concrete, or any other material that is being crushed.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A method of transporting a mobile aggregate plant comprising the steps of:
    providing a first towing tractor attached to an end of a rock crusher section when said rock crusher section is coupled to a material feed section;
    charging a feeder air supply reservoir and a crusher section air supply reservoir from an air source on the first towing tractor;
    disconnecting an air supply line; a common airbag supply line and an electrical line between the material feed section and the rock crusher section;
    turning a rear axle brake valve to an "on" position;
    towing the rock crusher section forward, so as to cause a sliding out from under the material feed section, and terminating further relative translational motion;
    starting a material feeder section pump and unfold a material feeder trailer jack to a position;
    extending the material feeder trailer jack to lift the material feed section;
    disconnecting a brake air control line;
    towing the rock crusher section away from the material feed section;
    backing a second tow tractor under the material feed section;
    using the material feeder trailer jack to adjust a height characteristic of the material feed section to allow for an engagement between the second tow tractor and the material feed section;
    continuing backing the second tow tractor into the material feed section until a lock engages;
    retracting and folding the material feeder trailer jack and turning off the material feeder section pump;
    attaching the air supply line to the second tow tractor; and
    turning the rear axle brake valve to an "off" position.

2. The method of claim 1 wherein said rock crusher section is rigidly coupled to the material feed section.

3. The method of claim 2 wherein the air supply line is an independent height adjustable air supply line.

4. The method of claim 3 wherein said an electrical line is a plurality of electrical lines.

5. The method of claim 4 wherein said rear axle brake valve is a manual rear axle brake valve.

6. The method of claim 5 wherein said step of towing the rock crusher section forward, so as to cause a sliding out from under the material feed section is done until contact with a slide stop is made which thereby prevents further relative translational motion.

7. The method of claim 6 where said pump is a hydraulic pump.

8. The method of claim 7 wherein said hydraulic pump is a gas-powered hydraulic pump.

9. The method of claim 8 where the step of extending the material feeder trailer jack to lift the material feed section is done to lift the material feed section above the slide stop.

10. The method of claim 9 wherein said lock is a king pin lock.

11. A method of transporting a rock crushing plant comprising the steps of:
    providing a first towing tractor attached to a front end of rock crusher section when it is rigidly coupled to material feed section;
    charging both feeder air supply reservoir and crusher section air supply reservoir from an air source on the first towing tractor;
    disconnect both independent height adjustable air supply line and common airbag supply line and electrical lines between material feed section and rock crusher section;
    turn manual rear axle brake valve to an "on" position;
    tow rock crusher section forward, thereby sliding out from under material feed section until contact with a slide stop is made, thereby preventing further relative translational motion;
    start material feeder section gas-powered hydraulic pump and unfold material feeder trailer jack to a vertical position;
    extend material feeder trailer jack to lift material feed section above the slide stop; disconnect brake air control lines;
    tow rock crusher section away from material feed section;
    back a second tow tractor under material feed section;
    use material feeder trailer jack to adjust height of material feed section to allow for engagement between second tow tractor and material feed section;
    continue backing second tow tractor into material feed section until king pin locks engage;
    hydraulically retract and fold material feeder trailer jack and turn off material feeder section gas-powered hydraulic pump;
    attach independent height adjustable air supply line to second tow tractor; and
    turn manual rear axle brake valve to an "off" position.

12. A method of transporting a mobile aggregate plant comprising the steps of:
    providing a first towing tractor attached to an end of a first aggregate material processing section when said first aggregate material processing section is coupled to a second aggregate material processing section;

charging a second section air supply reservoir and a first section air supply reservoir from an air source on the first towing tractor;

disconnecting an air supply line; a common airbag supply line and an electrical line between the second aggregate material processing section and the first aggregate material processing section;

turning a first axle brake valve to a position;

towing the first aggregate material processing section forward, so as to cause a sliding out from under the second aggregate material processing section, and terminating further relative translational motion;

starting a second section pump and unfolding a second section trailer jack to a position;

extending the second section trailer jack to lift the second aggregate material processing section;

disconnecting a brake air control line;

towing the first aggregate material processing section away from the material feed section;

backing a second tow tractor under the second aggregate material processing section;

using the second section trailer jack to adjust a height characteristic of the second aggregate material processing section to allow for an engagement between the second tow tractor and the second aggregate material processing section;

continuing backing the second tow tractor into the second aggregate material processing section until a lock engages;

retracting and folding the second section trailer jack and turning off the second section pump;

attaching the air supply line to the second tow tractor; and turning the first axle brake valve to a second position.

13. The method of claim 12 wherein the first aggregate material processing section is a rock crushing section.

14. The method of claim 12 wherein said second aggregate material processing section is a material feed section.

15. The method of claim 12 wherein first axle brake valve is a rear axle brake valve.

16. The method of claim 15 wherein said rear axle brake valve is a manual real axle brake valve.

17. The method of claim 12 wherein said second section pump is a hydraulic pump.

18. The method of claim 17 wherein said hydraulic pump is a gas-powered hydraulic pump.

19. The method of claim 12 wherein said lock is a king pin lock.

* * * * *